United States Patent
Rajagopalan et al.

(10) Patent No.: US 12,093,792 B2
(45) Date of Patent: Sep. 17, 2024

(54) INTELLIGENT ENGINES TO ORCHESTRATE AUTOMATIC PRODUCTION OF ROBOTIC PROCESS AUTOMATION BOTS BASED ON ARTIFICIAL INTELLIGENCE FEEDBACK

(71) Applicant: Bank of America Corporation, Charlotte, NC (US)

(72) Inventors: Raghuraman Rajagopalan, Chennai (IN); Jigesh Rajendra Safary, Mumbai (IN); Krishna Rangarao Mamadapur, Pune (IN)

(73) Assignee: Bank of America Corporation, Charlotte, NC (US)

( * ) Notice: Subject to any disclaimer, the term of this patent is extended or adjusted under 35 U.S.C. 154(b) by 1004 days.

(21) Appl. No.: 17/073,834

(22) Filed: Oct. 19, 2020

(65) Prior Publication Data
US 2022/0121982 A1  Apr. 21, 2022

(51) Int. Cl.
| | |
|---|---|
| *G06N 20/00* | (2019.01) |
| *G06F 9/48* | (2006.01) |
| *G06F 9/50* | (2006.01) |
| *G06F 11/34* | (2006.01) |

(52) U.S. Cl.
CPC ........... *G06N 20/00* (2019.01); *G06F 9/4881* (2013.01); *G06F 9/5011* (2013.01); *G06F 11/3476* (2013.01); *G06F 2209/5018* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 6,497,566 B2 | 12/2002 | Dahl et al. | |
| 8,438,074 B2 | 5/2013 | Serbanescu | |
| 9,817,967 B1* | 11/2017 | Shukla | .............. G06F 21/45 |
| 10,452,674 B2* | 10/2019 | Diwan | ............... G06F 3/167 |
| 10,518,409 B2 | 12/2019 | Oleynik | |
| 10,783,229 B2 | 9/2020 | Buddhiraju et al. | |
| 10,908,950 B1* | 2/2021 | Dennis | ............. G06F 9/4881 |
| 10,960,541 B2* | 3/2021 | Nanal | ............ G06F 11/0715 |

(Continued)

FOREIGN PATENT DOCUMENTS

WO   2017070126 A1   4/2017

*Primary Examiner* — Van H Nguyen
(74) *Attorney, Agent, or Firm* — Banner & Witcoff, Ltd.

(57) ABSTRACT

Aspects of the disclosure relate to training and using machine-learning models to determine an optimal number of robotic process automation (RPA) bot instances to process a work queue. In some embodiments, a computing platform train a machine learning model based on RPA using process step information and historical execution log data. Thereafter, the computing platform may receive a current work queue of items to be processed, and determine, using the machine learning model, an optimal number of RPA bot instances to process a current work queue. The computing platform may send the determined optimal number of RPA bot instances to a RPA bot orchestrator on a virtual bot host server, causing the orchestrator to instantiate at least one bot instance corresponding to the determined optimal number of RPA bot instances to process items from the current work queue using the at least one bot instance.

20 Claims, 10 Drawing Sheets

(56) References Cited

U.S. PATENT DOCUMENTS

| | | | |
|---|---|---|---|
| 11,042,458 B2* | 6/2021 | Goyal | G06Q 10/10 |
| 11,074,105 B2* | 7/2021 | Walby | G06F 9/5072 |
| 11,531,846 B1* | 12/2022 | Bodapati | G06N 20/00 |
| 2016/0140500 A1 | 5/2016 | Rallapalli et al. | |
| 2017/0011308 A1 | 1/2017 | Sun et al. | |
| 2019/0332508 A1* | 10/2019 | Goyal | G06F 11/3414 |
| 2020/0147791 A1 | 5/2020 | Safary et al. | |
| 2020/0364083 A1* | 11/2020 | Walby | G06F 9/505 |

* cited by examiner

INTELLIGENT ENGINES TO ORCHESTRATE AUTOMATIC PRODUCTION OF ROBOTIC PROCESS AUTOMATION BOTS BASED ON ARTIFICIAL INTELLIGENCE FEEDBACK

BACKGROUND

Aspects of the disclosure relate to computer systems and networks. In particular, one or more aspects of the disclosure relate to training and using machine-learning models to determine an optimal number of robotic process automation (RPA) bot instances to process a work queue.

As computer systems are increasingly used to provide automated and electronic services, such computer systems may obtain and maintain increasing amounts of various types of sensitive information. Ensuring the safety and security of such information may thus be increasingly important. In many instances, however, it may be difficult to maintain efficient and effective technical operations of the computer systems that process such information and/or provide such automated and electronic services, particularly when also attempting to optimize the resource utilization, bandwidth utilization, and efficient operations of the enterprise computing infrastructure.

SUMMARY

Aspects of the disclosure provide effective, efficient, scalable, and convenient technical solutions that address and overcome the technical problems associated with optimizing the efficient and effective technical operations of computer systems. In particular, one or more aspects of the disclosure provide techniques for training and using machine-learning models to determine an optimal number of robotic process automation (RPA) bot instances to process a work queue.

In accordance with one or more embodiments, a computing platform having at least one processor, a communication interface, and memory may train a machine learning model based on RPA using process step information and historical execution log data. Subsequently, the computing platform may receive a current work queue of items to be processed using one or more RPA bot instances, and determine, using the machine learning model, an optimal number of RPA bot instances to process a current work queue. The computing platform may thereafter send the determined optimal number of RPA bot instances to an RPA bot orchestrator on a virtual bot host server, wherein sending the determined number of RPA bot instances to the RPA bot orchestrator causes the orchestrator to instantiate at least one bot instance corresponding to the determined optimal number of RPA bot instances to process items from the current work queue using the at least one bot instance.

In some embodiments, the computing platform may receive a shift execution log upon completion of the current work queue, wherein the shift execution log includes one or more computing metrics associated with completion of the current work queue. Subsequently, the computing platform may compare the one or more computing metrics associated with completion of the current work queue to one or more metrics used in calculating the determined optimal number of RPA bot instances, and determine if the machine learning model is to be updated based on comparing the one or more computing metrics associated with completion of the current work queue to one or more metrics used in calculating the determined optimal number of RPA bot instances. Based on determining that the machine learning model is to be updated, the computing platform may calculate an updated optimal number of RPA bot instances, and retrain the machine learning model with the updated optimal number of RPA bot instances.

In some embodiments, the computing platform may send results associated with completion of the current work queue to an enterprise computing device, wherein sending the results causes the enterprise computing device to display one or more graphical user interfaces associated with the results on the enterprise computing device.

In some embodiments, training the machine learning model includes receiving historical log information automatically sent by a process running on an enterprise server. The computing platform may provide a results display on a display of the computing platform, wherein the results display includes information relating to the current work queue and the determined optimal number of RPA bot instances.

In some embodiments, the computing platform may receive an update upon the current work queue being completed. In addition, the computing platform may update a process automation database based on receiving the update of the current work queue being completed, wherein the process automation database is updated to include the one or more metrics associated with completion of the current work queue.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
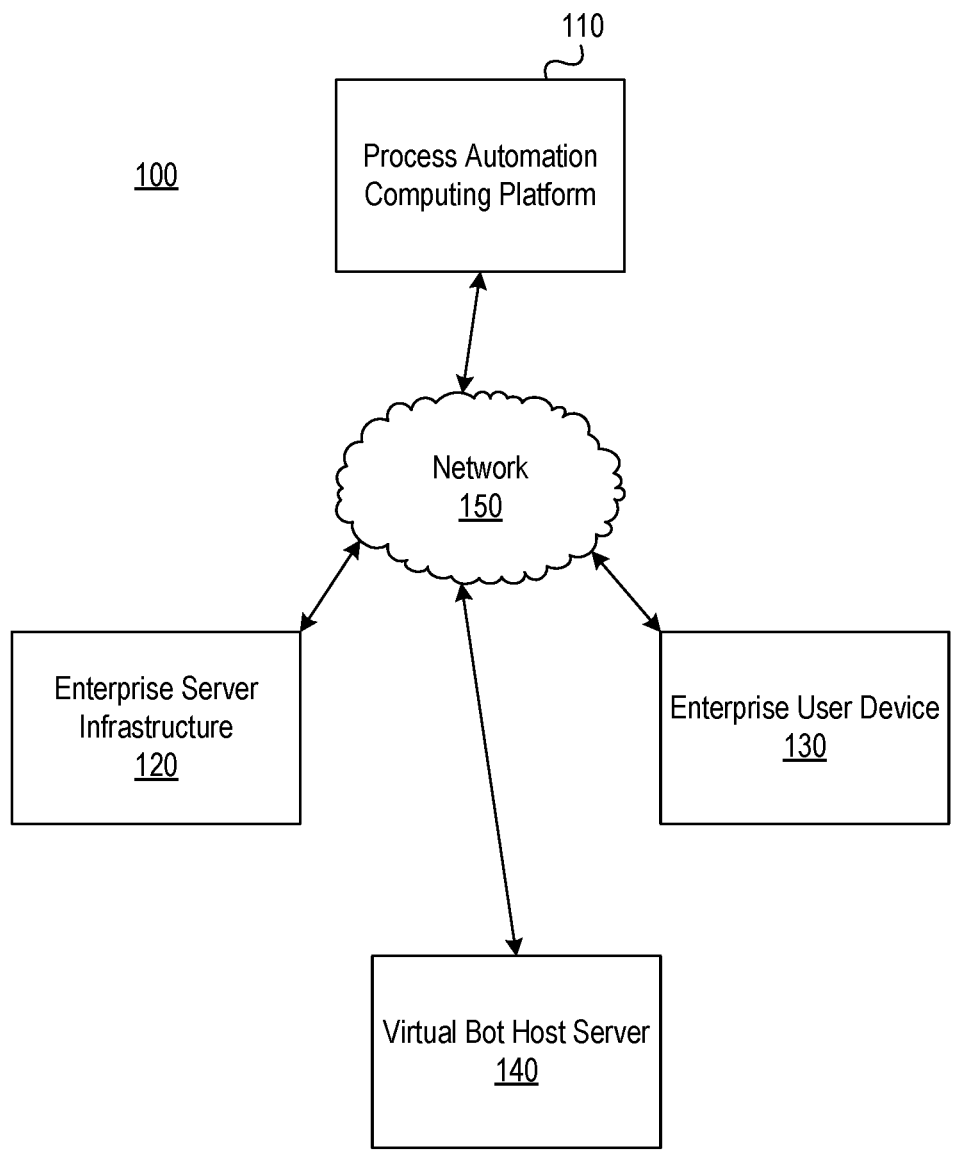
FIGS. 1A and 1B depict an illustrative computing environment for training and using machine-learning models to determine an optimal number of RPA bot instances to process a work queue in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. As a brief introduction to the concepts described further herein, one or more aspects of the disclosure provide systems and methods to efficiently and effectively implement artificial intelligence engines for automation of robotic process automation (RPA) bot instance workload production. For example, one or more of the systems and methods described herein are directed towards training and using machine-learning models to determine an optimal number of RPA bot instances to process a work queue. In one or more instances, artificial intelligence may be used to determine a number of RPA bot instances to complete a current work queue so as to optimize available resources. For example, a machine learning model may be trained (and re-trained) based on process step information and historical execution log data, and the one or more of the systems described herein may use a process automation computing platform to determine an optimal number of RPA bot instances for a current work queue. In one or more instances, the process automation computing platform may send the determined optimal number of RPA bot instances to an RPA bot orchestrator on virtual bot host server. In these instances, the RPA bot orchestrator may instantiate at least one bot instance corresponding to the determined optimal number of RPA bot instances to process items from the current work queue using the at least one bot instance.

Accordingly, by performing the one or more methods described herein, one or more technical advantages may be realized. For example, one technical advantage of using machine learning models in robotic process automation systems is that such techniques may optimize computing resources, and may complete current workloads more efficiently. This approach may allow for the completion of workloads in a more efficient and timely manner. Furthermore, one or more of the systems and methods described herein may improve computing resource capacity at one or more computing systems by reducing an amount of computing resources used for the completion of a current workload in certain instances. Similarly, the systems and methods described herein may conserve network bandwidth by reducing communications between enterprise devices in the processing and completion of current workloads.

Aspects of the present disclosure relate to training and using machine-learning models to determine an optimal number of robotic process automation (RPA) bot instances to process a work queue. A system may use a robot execution log from a RPA tool that is fed into an artificial intelligence (AI) system along with a process workload data. The AI system may then analyze the workload data and robot execution log. Based on this analysis and, in some instances, also based on historical process data, the system may change the parameters of RPA to determine an optimal number of RPA bot instances to be active for the given workload or work queue. The system may distribute a utilization model to handle a particular use case in a highly efficient manner. In that regard, based on the current workload and historical data, the AI system may determine an optimal number of RPA bot instances and may thereafter tune an RPA bot orchestrator accordingly.

Systems described herein may be fit to a generic framework for process automation. In some examples, the AI-based system may automatically tune the determined optimal number of RPA bot instances based on a workload log, and may adjust utilization of RPA bot instances used for a current work queue accordingly.

An RPA bot orchestrator on a virtual bot host server may receive the optimal number of RPA bot instances determined by the AI-based system so as to interface AI technology with high performance core technology. Based on a current volume of a given workload and a history of execution of one or more workloads, the AI-based system may determine how many active RPA bot instances are required for optimal resource utilization. An RPA bot orchestrator on a virtual bot host server may be tuned according to such a determination. As part of determining an optimal number of RPA bot instances to process a current work queue, the AI-based system may receive shift execution logs and history of execution of one or more workloads. Using this information, with a machine learning model, the AI-based system may calculate an optimal number of RPA bot instances to process a current work queue and, in some instance, may calculate other parameters related to the current work queue, and/or may configure an RPA bot orchestrator based on such calculations.

RPA shift execution logs may be captured by the AI-based system as unstructured data in text formats. These RPA shift execution logs may thus be fed to an analysis computing platform of the AI-based system as an input. The analysis computing platform may process the RPA shift execution log data and may tune the RPA tool, e.g., the virtual bot host server, based on the determined optimal number of RPA bot instances. Accordingly, based on a current work queue, and a history of execution of one or more workloads, the AI-based system may determine an optimal number of RPA bot instances and may tune the RPA bot orchestrator on a virtual bot host server according to the determined optimal number of RPA bot instances. The AI-based system may analyze results of certain workloads and related determinations and may output such results graphically, e.g., in the form of pie charts or other chart for further understanding and retraining to the system described herein to and better optimize resources of the RPA system.

In accordance with the systems and methods described herein, an RPA computing platform may receive data related to process steps (or process flow) and a current work queue. The RPA computing platform may send related information to a RPA bot orchestrator on a virtual bot host server. The RPA computing platform may also send historical execution log data to an AI computing platform. The AI computing platform may also receive the data related to process steps or flow and a current work queue. Based on the received data related to process steps or flow and a current work queue and the historical execution log data, the AI computing platform may determine an optimal number of RPA bot instances for the current work queue, e.g., using a machine learning model or a neural network. A virtual bot administrator computing device may receive the determined optimal number of RPA bot instances for the current work queue and may identity a virtual bot server for processing the current work queue. The virtual bot administrator computing device may then send the determined optimal number of virtual bot instance to an RPA bot orchestrator on the identified virtual bot host server. The RPA bot orchestrator on the identified virtual bot host server may then instantiate at least one bot instance corresponding to the determined optimal number of RPA bot instances to process items from the current work queue using the at least one bot instance, e.g., via Docker containers.

Systems and methods described herein may include a process for updating or retraining a machine learning model used for determining an optimal number of RPA bot instances to process a current work queue. Initially, a shift execution log may be sent to a process automation computing platform. Based on the history of time taken by each RPA bot instance to complete a work load (e.g., based on the shift execution log) and based on the determination made by the process automation computing platform associated with that shift, the process automation computing platform may determine whether the determined number of RPA bot instances to process a given work queue should be increased or decreased. If the determined number of RPA bot instances is to be changed, the process automation computing platform may calculate an updated optimal number of RPA bot instances. Accordingly, the machine learning model may be retrained with the updated optimal number of RPA bot instances. Subsequently, the results of such determinations made be transmitted and a report may be generated at an enterprise computing device.

In accordance with one or more embodiments, a computing platform having at least one processor, a communication interface, and memory may train a machine learning model based on robotic process automation (RPA) using process step information and historical execution log data. Subsequently, the computing platform may receive a current work queue of items to be processed using one or more RPA bot instances, and determine, using the machine learning model, an optimal number of RPA bot instances to process a current work queue. The computing platform may thereafter send the determined optimal number of RPA bot instances to a RPA bot orchestrator on a virtual bot host server, wherein sending the determined number of RPA bot instances to the RPA bot orchestrator causes the orchestrator to instantiate at least one bot instance corresponding to the determined optimal number of RPA bot instances to process items from the current work queue using the at least one bot instance.

An artificial intelligence model may learn the patterns based on historical log data related to the execution of workloads and may help calibrate the calculations for determined an optimal number of RPA bot instances based on optimizing available resources for a given work queue.

Figure 1B:
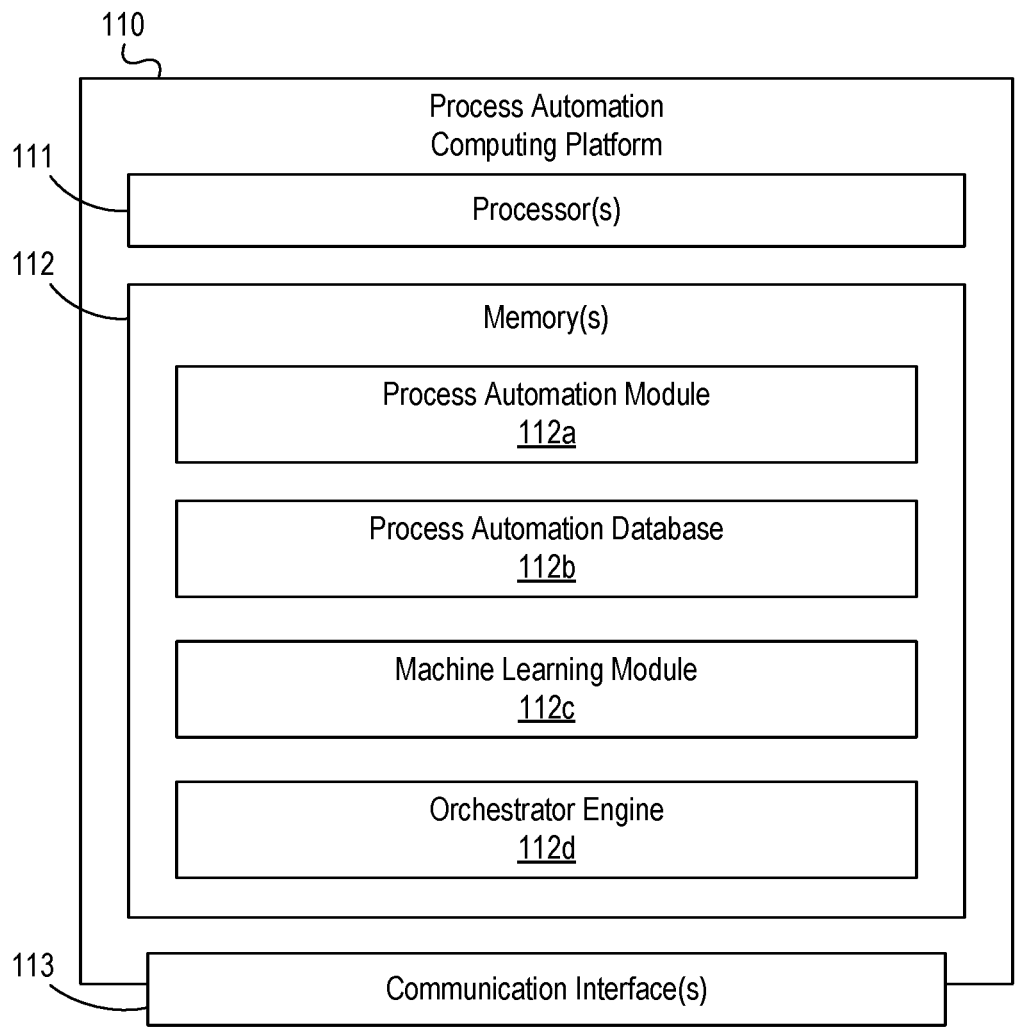

FIGS. 1A-1B depict an illustrative computing environment that trains and uses machine-learning models to determine an optimal number of RPA bot instances to process a work queue in accordance with one or more example embodiments. Referring to FIG. 1A, computing environment 100 may include one or more devices (e.g., computer systems, communication devices, servers). For example, computing environment 100 may include a process automation computing platform 110, an enterprise server infrastructure 120, an enterprise user computing device 130, and a virtual bot host server 140.

As described further below, process automation computing platform 110 may be a computer system that includes one or more computing devices (e.g., servers, server blades, or the like) and/or other computer components (e.g., processors, memories, communication interfaces) that may be used to implement process automation, machine learning algorithms, artificial intelligence, or the like to recognize workload patterns and generate optimal numbers of RPA bot instances to complete such workloads accordingly. In some instances, the process automation computing platform 110 may be maintained by an enterprise organization (e.g., a financial institution, or the like) and may be configured to receive process step information relating to one or more enterprise processes and historical execution log data relating to previous processes, train a machine learning model based on RPA, and determines an optimal number of RPA bot instances to complete a current work queue. In some instances, the process automation computing platform 110 may be configured to maintain a process automation model that stores correlations between process step information execution log data, and other parameter relating to completing a workload, and may be configured to update the process automation machine learning model based on received information.

Enterprise server infrastructure 120 may include one or more computing devices and/or other computer components (e.g., processors, memories, communication interfaces). In addition, and as illustrated in greater detail below, enterprise server infrastructure 120 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which enterprise server infrastructure 120 may be deployed.

In some arrangements, enterprise server infrastructure 120 may include a server, server blade, or the like configured to host an enterprise service (e.g., a mobile banking application, ATM service, or the like). In one or more instances, the enterprise server infrastructure 120 may be configured to communicate with enterprise user devices (e.g., enterprise user computing device 130, or the like) to process workload based on various parameters and user inputs received at enterprise user devices. In some instances, the enterprise server infrastructure 120 may be configured to cause display (e.g., at enterprise user computing device 130, or the like), of a particular user interface based on information received from the process automation computing platform 110.

Enterprise user device 130 may include one or more computing devices and/or other computer components (e.g., processors, memories, communication interfaces). In addition, and as illustrated in greater detail below, enterprise user computing device 130 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which enterprise user computing device 130 may be deployed.

In some arrangements, enterprise user computing device 130 may be a desktop computer, laptop computer, tablet, mobile device, or the like, and may be used by an individual such as a client or employee of an enterprise organization (e.g., a financial institution, or the like). For example, enterprise user computing device 130 may be configured to communicate with enterprise server infrastructure 120 to facilitate display of user interfaces (e.g., interfaces that generate a report of parameters associated with the completion of a workload, updates to the machine learning model calculations for completing a workload, or the like) based on received workload information.

In some arrangements, enterprise user computing device 130 may be linked to and/or used by one or more enterprise users (who may, e.g., be employees of an enterprise organization operating the enterprise center where enterprise user computing device 130 is deployed and/or used). For instance, enterprise user computing device 130 may be deployed at an enterprise center, such as the enterprise center where enterprise server infrastructure 120 is deployed, so that enterprise user computing device 130 may be used by one or more employees of an enterprise organization operating the enterprise center. For example, enterprise user computing device 130 may store and/or execute one or more enterprise applications, such as account creation and management applications, transaction history applications, lending applications, brokerage applications, and/or other applications, which may be used by the one or more enterprise users of enterprise user computing device 130.

Virtual bot host server 140 may include one or more computing devices and/or other computer components (e.g., processors, memories, communication interfaces). In addition, virtual bot host server 140 include a bot orchestrator which may be configured to generate, host, transmit, and/or otherwise provide one or more virtual bot instances (which may, e.g., process items from a current work queue using at least one bot instance). In some instances, the virtual bot instances instantiated by the bot orchestrator of the virtual bot host server 140 may be used for processing and completing a current work queue or work load provided by an enterprise organization, as will be described in greater detail below.

Computing environment 100 also may include one or more networks, which may interconnect process automation computing platform 110, enterprise server infrastructure 120, enterprise user computing device 130, virtual bot host server 140, or the like. For example, computing environment 100 may include a network 150 (which may interconnect, e.g., process automation computing platform 110, enterprise server infrastructure 120, enterprise user computing device 130, virtual bot host server 140, and/or one or more other systems which may be associated with an enterprise organization, such as a financial institution, with one or more other systems, public networks, sub-networks, and/or the like).

In one or more arrangements, process automation computing platform 110, enterprise server infrastructure 120, enterprise user computing device 130, and virtual bot host server 140, may be any type of computing device capable of sending and/or receiving workload data and processing the workloads accordingly. For example, process automation computing platform 110, enterprise server infrastructure 120, enterprise user computing device 130, virtual bot host server 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of process automation computing platform 110, enterprise server infrastructure 120, enterprise user computing device 130, and/or virtual bot host server 140 may, in some instances, be special-purpose computing devices configured to perform specific functions.

As illustrated in greater detail below, process automation computing platform 110 may include one or more computing devices configured to perform one or more of the functions described herein. For example, process automation computing platform 110 may include one or more computers (e.g., laptop computers, desktop computers, servers, server blades, or the like).

Referring to FIG. 1B, process automation computing platform 110 may include one or more processors 111, memory 112, and communication interface 113. A data bus may interconnect processor 111, memory 112, and communication interface 113. Communication interface 113 may be a network interface configured to support communication between process automation computing platform 110 and one or more networks (e.g., network 150, or the like). Memory 112 may include one or more program modules having instructions that when executed by processor 111 cause process automation computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of process automation computing platform 110 and/or by different computing devices that may form and/or otherwise make up process automation computing platform 110. For example, memory 112 may have, host, store, and/or include process automation module 112a, process automation database 112b, machine learning module 112c, and orchestrator engine 112d.

Process automation module 112a may have instructions that direct and/or cause process automation module to execute advanced process automation techniques related to RPA-based workloads, e.g., using machine learning models, as discussed in greater detail below. Process automation database 112b may store information used by process automation module 112a and/or process automation computing platform 110 in application of process automation techniques related to completing RPA-based workloads using machine learning models, and/or in performing other related functions for processing and maintaining enterprise-managed information and resources. Machine learning module 112c may have instructions that direct and/or cause the process automation computing platform 110 to set, define, and/or iteratively refine optimization rules and/or other parameters used by the process automation computing platform 110 and/or other systems in computing environment 100. Orchestrator engine 112d may have instructions that direct and/or cause the process automation computing platform 110 to set, define, direct and/or cause a determined number of virtual instances to be instantiated by the virtual bot host server 140 refine optimization rules and/or other parameters used by the process automation computing platform 110 and/or other systems in computing environment 100.

Figure 2A:
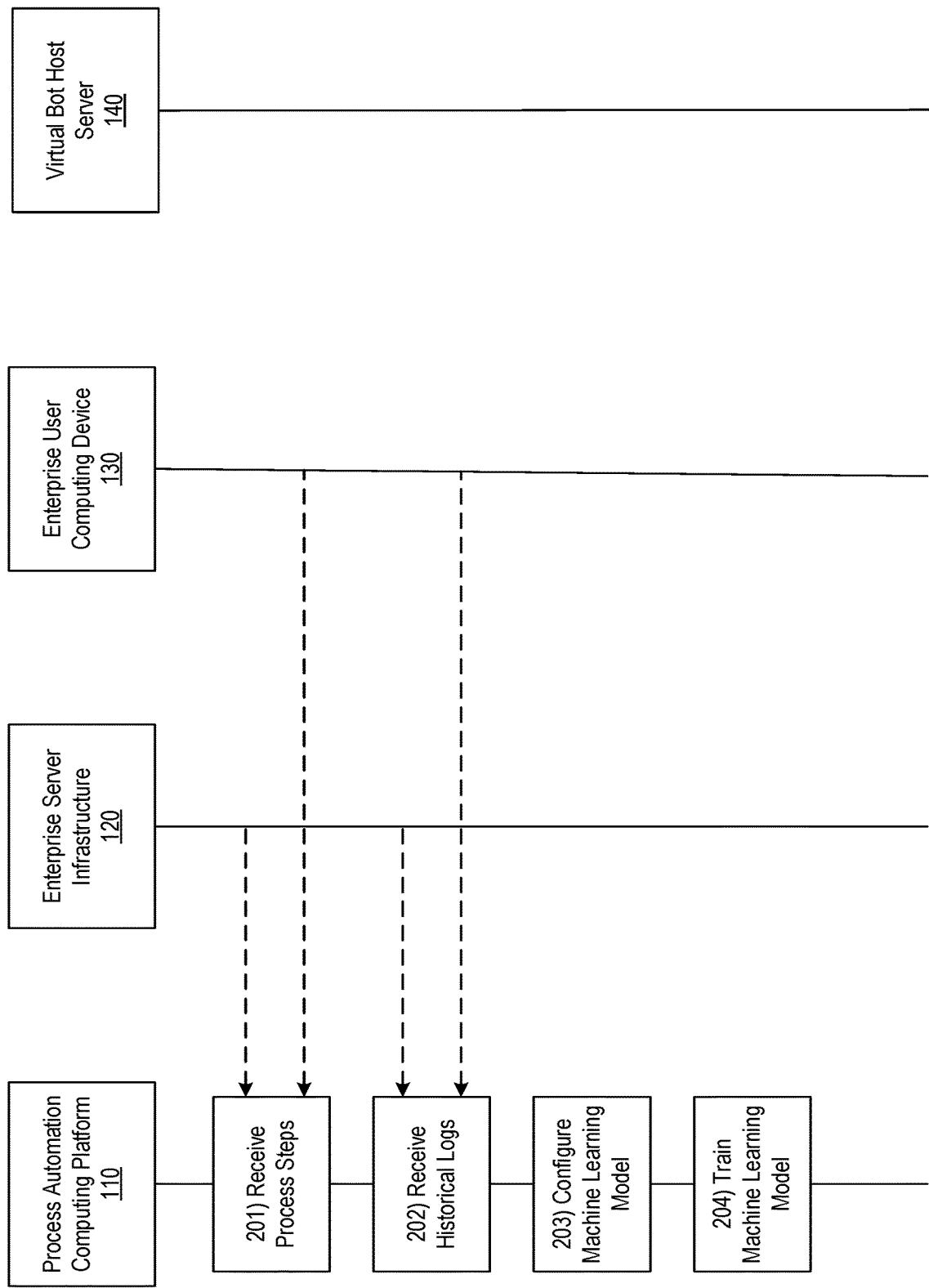
FIGS. 2A-2E depict an illustrative event sequence for training and using machine-learning models to determine an optimal number of RPA bot instances to process a work queue in accordance with one or more example embodiments.

FIGS. 2A-2E depict an illustrative event sequence for training and using machine-learning models to determine an optimal number of RPA bot instances to process a work queue in accordance with one or more example embodiments. Referring to FIG. 2A, at step 201, process automation computing platform 110 may receive process step information associated with a given process. For example, the process step information may be sent from the enterprise server infrastructure and/or the enterprise user computing device 130. The process step information may be sent or loaded by a process running on a server in the enterprise server infrastructure 120.

For example, at step 201, process automation computing platform 110 may receive, via the communication interface (e.g., communication interface 113), from one or more data source computer systems (e.g., from enterprise server infrastructure 120, enterprise user computing device 130, and/or one or more other data sources), process step information. The process step information may, for instance, include event data, transaction data, and/or activity data that is transmitted by and/or received from internal event feeds (e.g., feeds originating from sources within the enterprise organization), external event feeds (e.g., feeds originating from sources outside of the enterprise organization), internal enterprise systems (e.g., systems within the enterprise organization), external enterprise systems (e.g., systems outside of the enterprise organization), and/or other sources. The event data may, for instance, identify specific events occurring as part of a given process. The transaction data may, for instance, identify specific transactions being conducted on accounts as part of a given process. The activity data may, for instance, identify specific activity occurring as part of a given process.

At step 202, the process automation computing platform 110 may receive historical log information associated with a given process, e.g., for an actual process that had previously been completed. For example, the historical log information may be sent from the enterprise server infrastructure and/or the enterprise user computing device 130. The historical log information may be sent or loaded by a process running on a server in the enterprise server infrastructure 120. In some examples, steps 201 and 202 may occur simultaneously. In other examples, steps 201 and 202 may be two separate and distinct steps in a process as described herein. In some instances, historical log information may not yet exist for a given process. The process automation computing platform 110 may accordingly proceed without historical log information and/or may obtain historical log information of related types of processes, as will be described in greater detail below.

For example, at step 202, process automation computing platform 110 may receive, via the communication interface (e.g., communication interface 113), from one or more data source computer systems (e.g., from enterprise server infrastructure 120, enterprise user computing device 130, and/or one or more other data sources), process step information. The historical log information may, for instance, include event data, transaction data, and/or activity data that is transmitted by and/or received from internal event feeds (e.g., feeds originating from sources within the enterprise organization), external event feeds (e.g., feeds originating from sources outside of the enterprise organization), internal enterprise systems (e.g., systems within the enterprise organization), external enterprise systems (e.g., systems outside of the enterprise organization), and/or other sources. The event data may, for instance, identify specific events occurring as part of a historical process. The transaction data may, for instance, identify specific transactions being conducted on accounts as part of a historical process. The activity data may, for instance, identify specific activity occurring as part of a historical process. The process automation computing platform 110 may also receive information relating to computing resources, e.g., virtual bot instances, which were utilized as part of a historical process.

At step 203, the process automation computing platform 110 may receive configure a machine learning model for determining an optimal number of RPA bot instances for processing a current work queue. For example, the process automation computing platform 110 may choose one or more algorithms, define parameters, and the like. The machine learning model may be configured based on various classifications and/or regression models, such as neural networks, decisions trees, decisions forests, standard linear regressions, Bayesian regressions, and other algorithms.

At step 204, the process automation computing platform 110 may receive train the machine learning model based on the information received at step 201 and/or at step 202. For example, at step 204, process automation computing platform 110 may train a machine learning RPA model by providing a dataset based on process step and historical log information to produce a trained model. For instance, process automation computing platform 110 may receive historical log information associated with non-optimal workload processing (e.g., under or over utilization of implemented resources, such as virtual bot instances, processing time, idle time, and the like) and/or features associated with more optimal workload processing (e.g., without under or over utilization of implemented resources, and/or minimizing processing time, idle time, and the like). Such information may, for instance, indicate specific parameters or settings, specific to a given process, that are correlated with more optimal or less optimal workload processing. Subsequently, process automation computing platform 110 may process the received information (e.g., using a machine learning engine and/or machine learning application programming interface (API)) to create, train, and/or otherwise generate the machine learning model.

At step 204, process automation computing platform 110 may apply the machine learning model configured at step 203 to the information received at step 201 and/or at step 202. For example, at step 204, process automation computing platform 110 may apply a machine learning RPA model to the information received from the one or more data source computer systems relating to a given process. For instance, process automation computing platform 110 may apply the RPA model configured at step 203 to return one or more results indicating whether conditions in the historical log information (e.g., virtual bot instances utilized relevant to events, transactions, activity, or the like in a process) being correlated with more optimal or less optimal workload processing. In applying the RPA model to the information received, process automation computing platform 110 may compute a score within the range of 0 to 1, where 0 represents minimally efficient computing resource usage and 1 represents fully optimized computing resource usage, based on the distance(s) between the process step and historical log information and corresponding features of the machine learning model.

In some embodiments, configuring the machine learning model to the information received from the one or more data source computer systems may include applying the machine learning model to process identification data received from an enterprise center system deployed at the enterprise center. For example, in training the machine learning model to the information received from the one or more data source computer systems (e.g., enterprise server infrastructure 120, enterprise user computing device 130) at step 204, process automation computing platform 110 may train the machine learning model to process identification data received from an enterprise center system (e.g., enterprise server infrastructure 120) deployed at the enterprise center. For instance, the process identification data received from the enterprise center system (e.g., server infrastructure 120) deployed at the enterprise center may include a list of processes (e.g., process identifiers, process steps, process types, process resource requirements, and/or other process step properties) that are currently present at and/or have been recently detected at the enterprise center.

In some embodiments, training the machine learning model to the information received from the one or more data source computer systems may include training the machine learning model to internal data received from the enterprise center system deployed at the enterprise center, where the enterprise center is operated by an enterprise organization. For example, in training the machine learning model to the information received from the one or more data source computer systems (e.g., enterprise server infrastructure 120, enterprise user computing device 130) at step 204, process automation computing platform 110 may train the machine learning model to internal data received from the enterprise center system (e.g., enterprise user computing device 130) deployed at the enterprise center, where the enterprise center is operated by an enterprise organization.

In some embodiments, training the machine learning model to the information received from the one or more data source computer systems may include training the machine learning model to external data received from a third-party system deployed at a third-party center different from the enterprise center, where the third-party center is operated by an organization different from the enterprise organization. For example, in training the machine learning model to the information received from the one or more data source computer systems (e.g., enterprise server infrastructure 120, enterprise user computing device 130) at step 204, process automation computing platform 110 may train the machine learning model to external data received from a third-party system deployed at a third-party center different from the enterprise center, where the third-party center is operated by an organization different from the enterprise organization.

In some embodiments, training the machine learning model at step 204 may include prompting an enterprise associate at the enterprise center (e.g., via enterprise user computing device 130) to corroborate dataset results produced by the machine learning model. For example, in training the machine learning model at step 204, process automation computing platform 110 may prompt an enterprise associate at the enterprise center to corroborate dataset results produced by the machine learning model. For instance, in prompting the enterprise associate at the enterprise center to corroborate the dataset results produced by the machine learning model, process automation computing platform 110 may ask the associate to provide input confirming a virtual bot instance determination by the machine learning model, e.g., based on comparisons to identified previous workloads and/or based on available enterprise computing resources. In response, the associate may provide a confirmation of the virtual bot instance determination, or may provide feedback that the virtual bot instance determination should be increased or decreased.

Figure 2B:
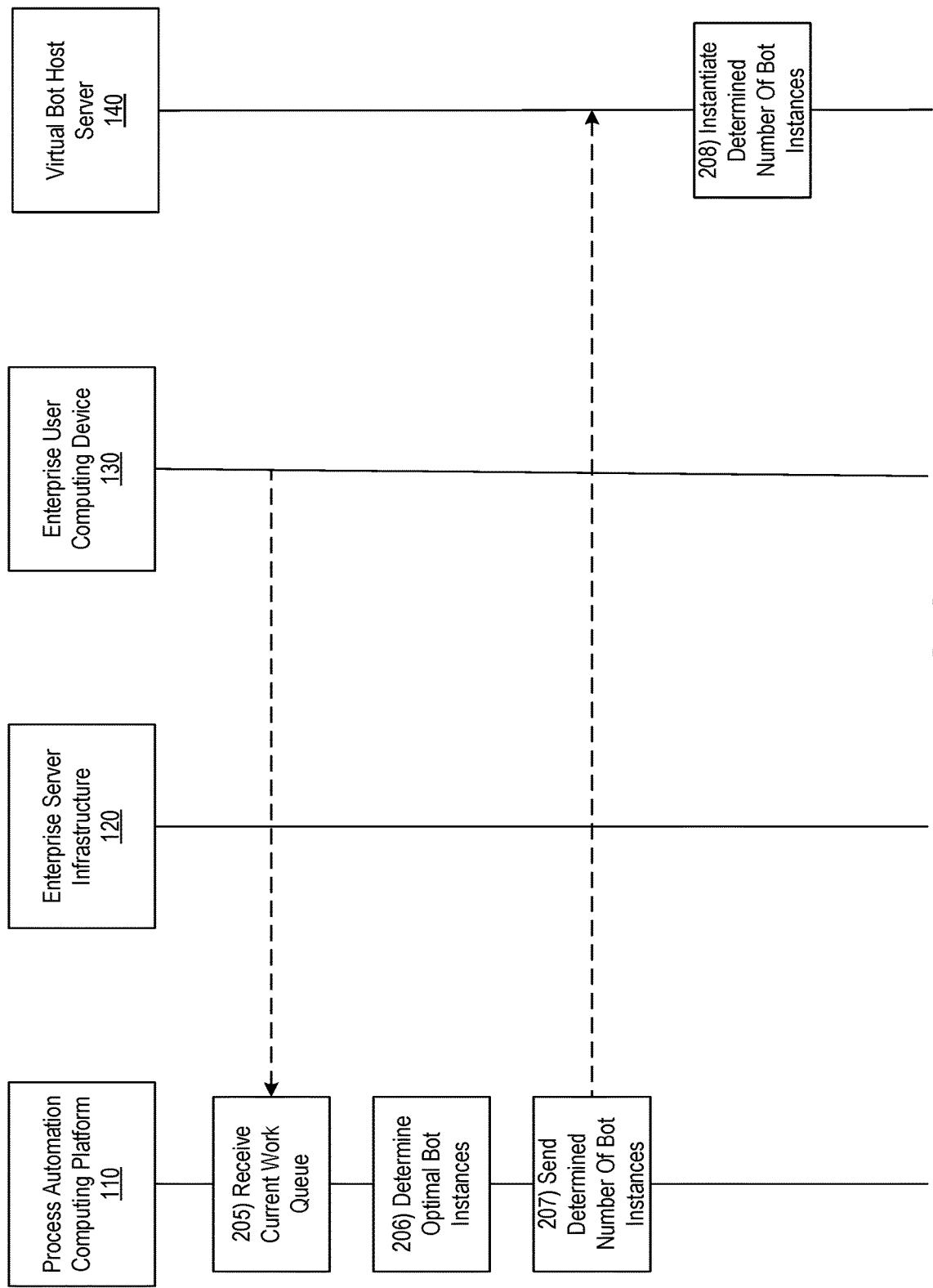

Referring to FIG. 2B, at step 205, process automation computing platform 110 may receive a current work queue. For example, at step 205, after the machine learning model has been configured and trained, process automation computing platform 110 may receive information related to a current work queue, e.g., from enterprise user computing device 130. In receiving the current work queue data, process automation computing platform 110 may generate and/or send one or more commands to enterprise user computing device 130 directing enterprise user computing device 130 to capture various types of data relating to the current work queue, including work queue process steps, process resources, estimated runtimes, and/or other related information.

At step 206, process automation computing platform 110 may determine an optimal number of RPA bot instances to process the current work queue using the machine learning model. In determining the optimal number of RPA bot instances to process the current work queue, process automation computing platform 110 may, for instance, input various parameters obtained with the current work queue information into an algorithm of the machine learning model. In addition to the optimal number of RPA bot instances, the process automation computing platform 110 may determine other information related to the current work queue, such as an estimated time to complete the work queue, process step information for various steps of the current work queue, RPA bot instance determinations for various steps of the current work queue, and the like.

At step 207, the process automation computing platform 110 send the determined optimal number of RPA bot instances to the virtual bot host server 140. The virtual bot host server 140 may include an orchestration engine to instantiate or spin down a number of virtual bot instances or virtual machines. In some arrangements, the virtual machines or bots may be hosted or executed on the process automation computing platform 110 itself. Such virtual bot instance determination may, for instance, include a number or virtual bot instances as well as related parameters associated with the bot instances. At step 208, an orchestrator engine of the virtual bot host server 140 may instantiate at least one virtual bot instance corresponding to the determined optimal number and process items from the current work queue using the at least one bot instance, as described in greater detail below.

The virtual bot instances (also referred to herein as virtual bots, virtual machines, or virtual servers) may include a virtual representation or emulation of a physical computer. As described herein, the virtual bot instances may be referred to as "guests" while the physical computing device on which they run on may be referred to as the "host." Systems and methods employing virtual bot instances may allow for multiple virtual bots or virtual machines (e.g., each having their own operating system and applications) to run on a single physical machine. Rather than interacting directly with a physical computer, virtual bot employ a hypervisor to coordinate between the virtual bot and the physical computer that the virtual bot runs on. The hypervisor may allocate physical computing resources (e.g., processors, memory, storage, and the like) to each virtual bot. The hypervisor may keep each virtual bot separate from other virtual bots, so as to avoid the virtual bots interfering with each other. With the hypervisor operating on a physical computer or server, the operating system and applications running therein may be separated from the hardware, such that the physical computer is able to divide in one or more independent virtual machines.

The virtual machine may then run their own operating systems and applications independently while sharing resources (e.g., memory, RAM, storage, and the like) from the physical computer managed by the hypervisor. The hypervisor may sort, direct, and/or allocate computing resources of the physical computer to each of the virtual machines, and may ensure that the virtual machines do not disrupt each other. The hypervisor may run directly on the physical hardware (e.g., a server) and may take the place of the operating system. In certain instances, the hypervisor may create multiple virtual machine templates for different purposes, such as software testing, database productions, environment developments, and the like. In some instances, the hypervisor may run as an application within a host operating system and target single-user computing devices within the enterprise organization. The hypervisor may then allocate physical resources to the virtual machines, e.g., manually setting the amount of processor cores and/or memory to be used.

Figure 2C:
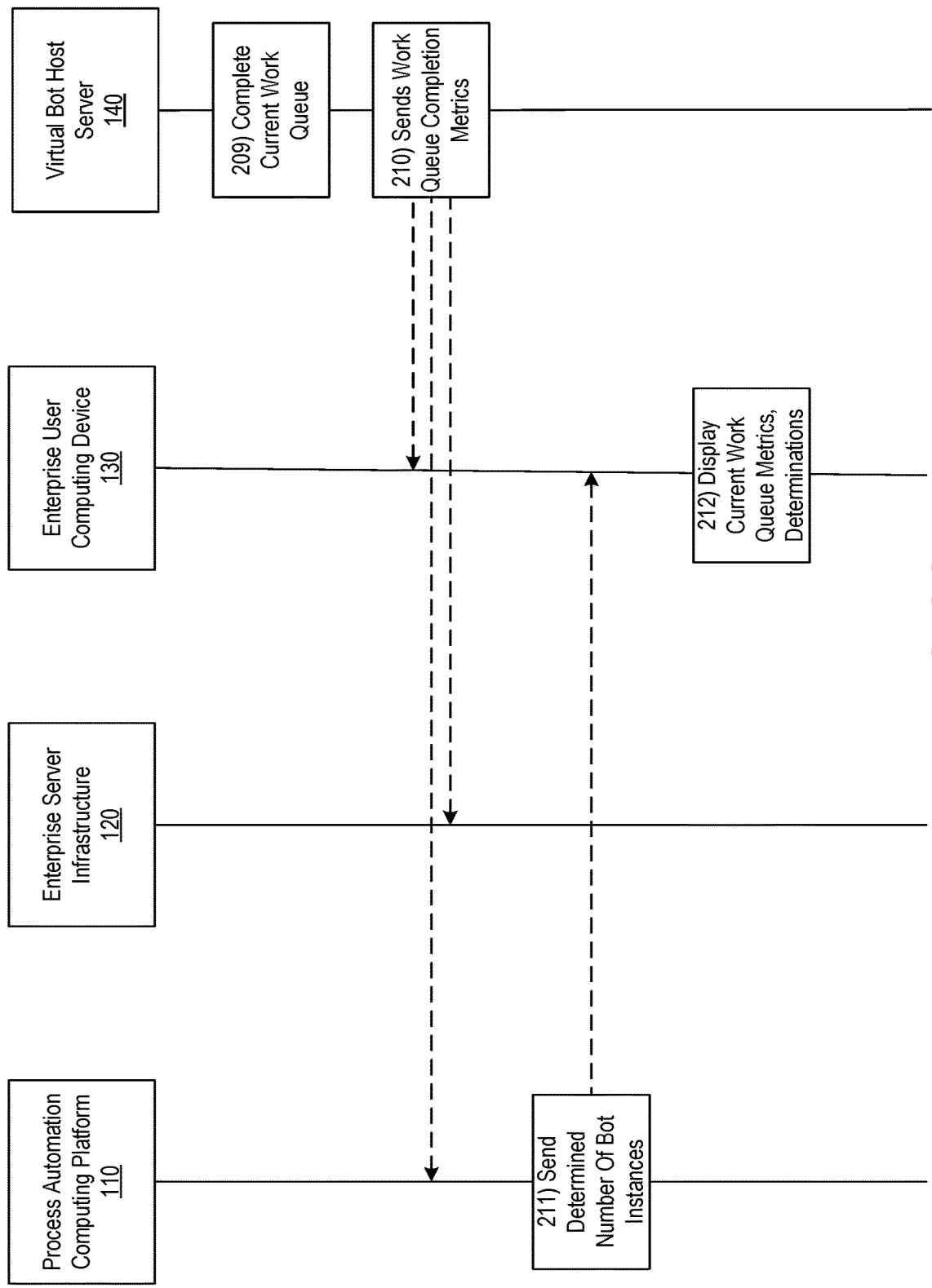

Referring to FIG. 2C, at step 209, the virtual bot host server 140 may complete the current work queue using the at least one virtual bot instance as described above. For instance, at step 209, items from the current work queue may be processed and completed using the at least one virtual bot instance, in accordance with the optimal number of virtual bot instances determined by the process automation computing platform 110. In some instances, step 209 my include transmitting a notification to the process automation computing platform 110 that the current work queue has been completed and/or related parameters associated with the processing and completion of the work queue, such as the number of virtual bot instances user, timing to complete the current work queue, resources used to complete the current work queue, and the like.

At step 210, the virtual bot host server 140 may send metrics related to the current work queue to the process automation computing platform 110, the enterprise server infrastructure 120 and/or the enterprise user computing device 130. For instance, at step 210, metrics related to the current work queue may be added to a database on the enterprise server infrastructure 120, enterprise user computing device, process automation computing platform 110, and the like.

At step 211, process automation computing platform 110 may transmit the determined number of RPA bot instances to enterprise user computing device 130. For example, at step 211, process automation computing platform 110 may transmit, to the enterprise user computing device 130, the optimal number of RPA bot instances determined by the machine learning model and/or other parameters related to the determination of the optimal number, and/or other parameters associated with the actual completion of the work queue.

At step 212, the enterprise user computing device 130 provide a display related to the current work queue and a determined optimal number of virtual bot instances associated with the current work queue. For example, at step 212, process automation computing platform 110 may generate one or more messages based on the completion of a current work queue and may transmit the one or more messages to the enterprise user computing device 130. The one or more alert messages generated by process automation computing platform 110 may, for instance, include any and/or all of the information captured by process automation computing platform 110, such as process information, process type information, virtual bot instance information, process resource information, and/or other information.

Figure 3:
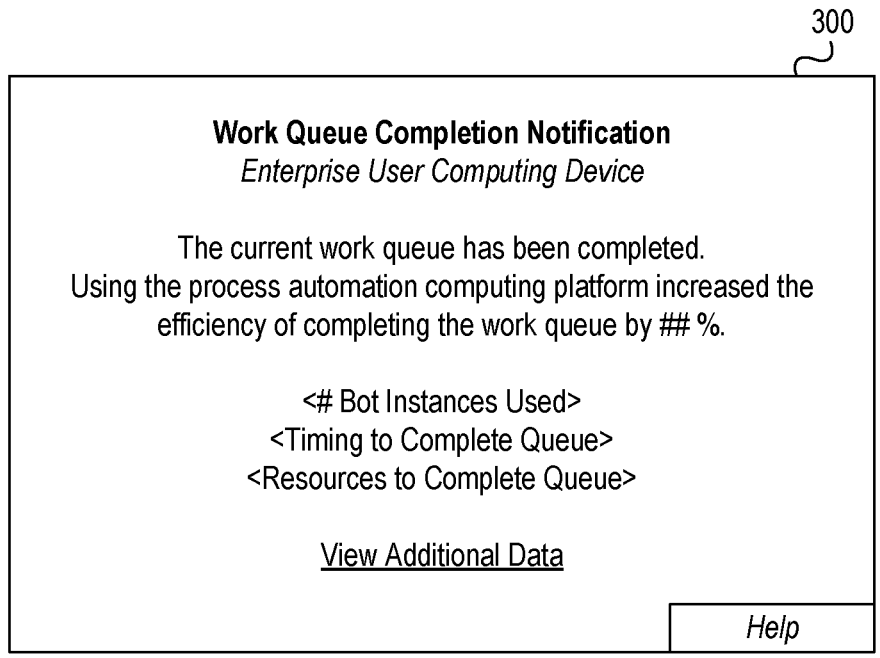
FIGS. 3-4 depict example graphical user interfaces relating to machine-learning models trained and used to determine an optimal number of RPA bot instances to process a work queue in accordance with one or more example embodiments.

Additionally or alternatively, in providing the display related to the current work queue and a determined optimal number of virtual bot instances associated with the current work queue, process automation computing platform 110 may generate and/or send information to a device linked to an enterprise associate (e.g., enterprise user computing device 130) which may cause enterprise user computing device 130 to generate, display, and/or otherwise present a graphical user interface similar to graphical user interface 300, which is illustrated in FIG. 3. As seen in FIG. 3, graphical user interface 300 may include text and/or other information indicating that the current workload has been completed and providing an indication how efficiency increases provided as a result of using the process automation computing platform 110 (e.g., "The current work queue has been completed. Using the process automation computing platform increased the efficiency of completing the work queue by ##%."), providing the workload completion results produced using the machine learning model (e.g., number of virtual RPA bot instances used, timing to complete the work queue, resources used to complete the work queue, and the like), as well as one or more user-selectable controls allowing the user of enterprise user computing device 130 to view the additional data relating to the machine leaning model calculations and associated parameters (e.g., "View Additional Data").

Figure 2D:
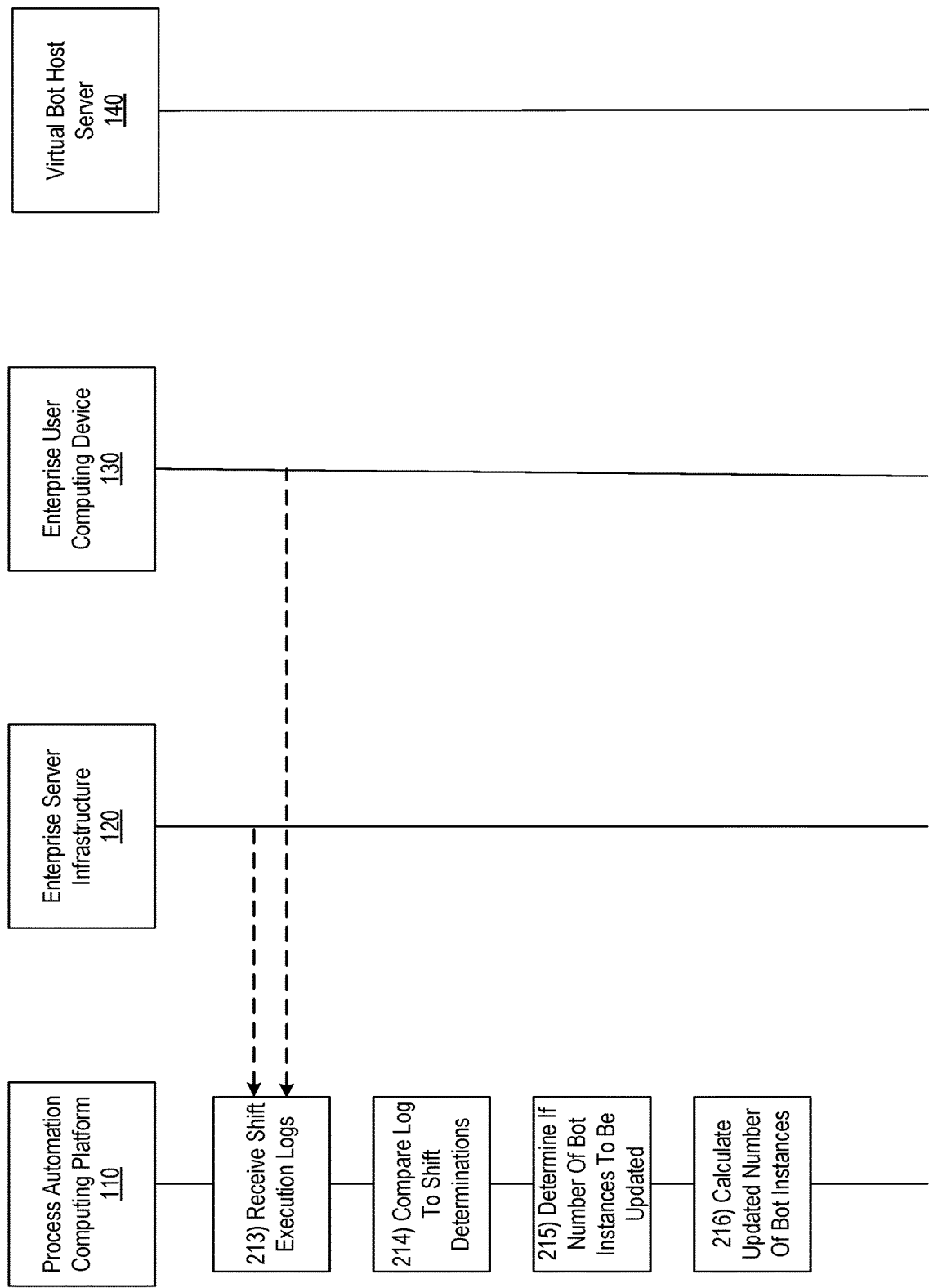

Referring to FIG. 2D, at step 213, process automation computing platform 110 may receive a shift execution log from enterprise server infrastructure 120 and/or enterprise user computing device 130. For example, at step 213, process automation computing platform 110 may receive, via the communication interface (e.g., communication interface 113), from one or more enterprise computer systems (e.g., enterprise server infrastructure 120, enterprise user computing device 130), the one or more shift execution parameters related to completion of a current work queue. Such shift execution parameters may include a number of virtual bot instances used, run time to complete the work queue, process resources used for the current work queue, process information for the work queue, and the like.

In some embodiments, one or more aspects of the shift execution log data may differ from parameters considered or determined by the process automation computing platform 110 prior to processing of the current work queue. At step 214, process automation computing platform 110 may compare the shift execution log data to one or more parameters and/or metric considered or determined by the process automation computing platform 110 prior to processing of the current work queue. For example, at step 214, process automation computing platform 110 may compare the computing resources used to process the current work queue with a calculation of estimated computing resources needed to process a current work queue. Similarly, the process automation computing platform 110 may compare the computing time to process the current work queue with a calculation of estimated computing time needed to process a current work queue. In another instance, the process automation computing platform 110 may determine an optimal number of virtual bot instances for processing the current workload, but for various reasons, the virtual bot host server 140 may instantiate a number of RPA bot instances different than the determined optimal number of virtual bot instances, e.g., due to constraints related to other work queues being processed, due to a prioritization of a work queue relative to other work queues, and the like.

At step 215, process automation computing platform 110 may determine if the number of virtual bot instances determined by the machine learning model is to be updated. For example, based on the comparing performed at step 214 at step 215, process automation computing platform 110 may determine that the number of virtual bot instances determined by the machine learning model is to be updated based on a difference exceeding a threshold between one or more input or calculated parameters and one or more measured or actual parameters associated with the processing of a current workload. In that regard, the process automation computing platform 110 may compile a set of input or calculated parameters that were part of initial determinations made prior to the processing of a current work queue. The process automation computing platform 110 may also compile a set of measure or actual parameters that were part of processing and completing of a current work queue. The process automation computing platform 110 may then compare the set of input or calculated parameters with the set of corresponding measured or actual parameters as part of step 214. Based on this comparing at step 214, at step 215 the process automation computing platform may determine if the number of virtual bot instances determined by the machine learning model is to be updated.

At step 216, if the machine learning model is to be updated (e.g., based on the determination made at step 215) process automation computing platform 110 may calculate an updated number of virtual bot instances for optimization of available resources based on the historical log information and based on the differences noted between input or calculated parameters from before the processing and actual or measured parameters from the processing and completion of the work queue.

Figure 2E:
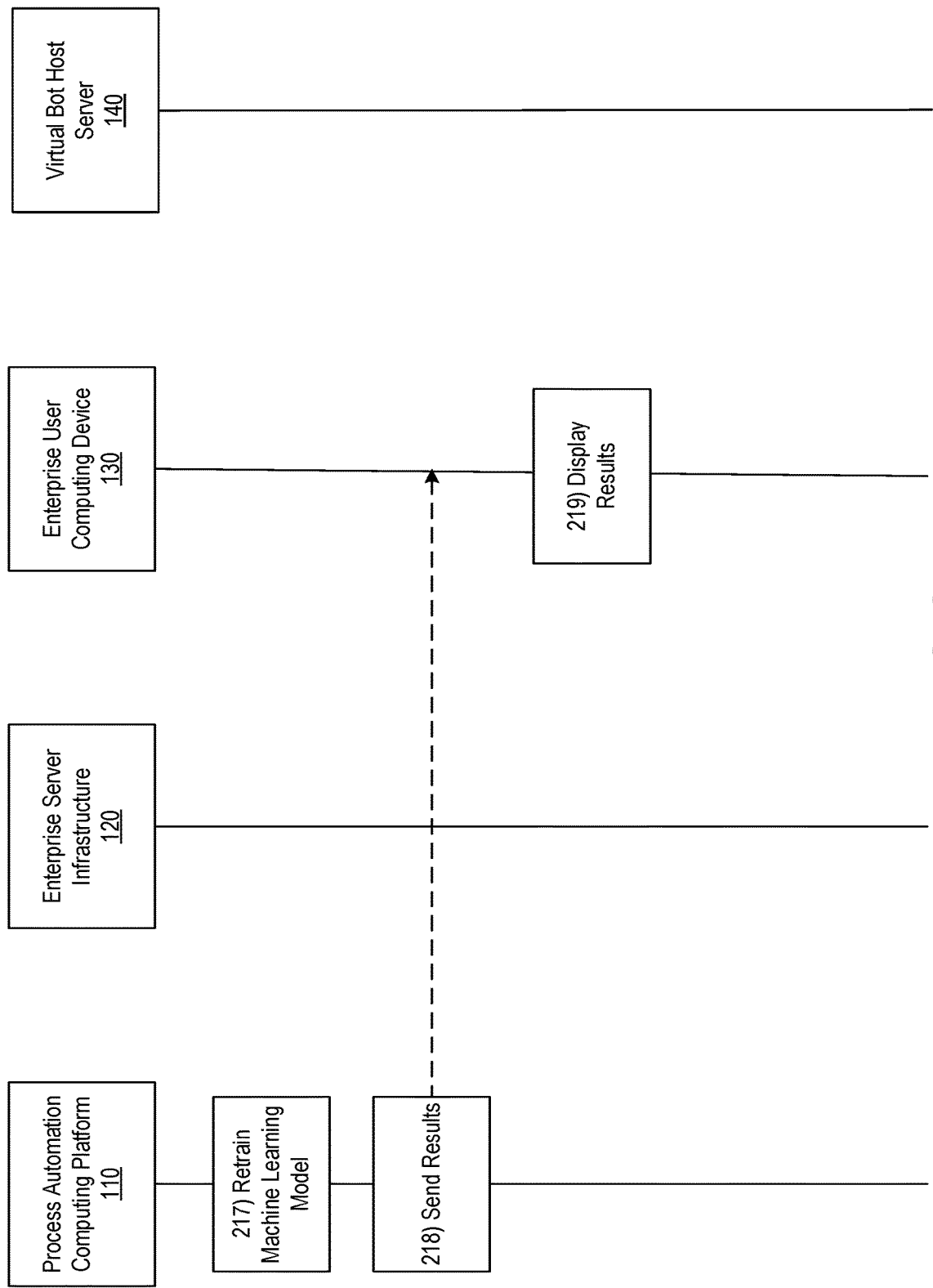

Now referring to FIG. 2E, at step 217, the process automation computing platform 110 may update the machine learning model. For example, process automation computing platform 110 may retrain and/or otherwise update the machine learning model based on validation information and/or labeled data received from the enterprise server infrastructure 120, enterprise user computing device 130 and/or one or more other sources (e.g., confirming and/or rejecting one or more determinations made by the machine learning model, including the determination made at step 206 as to an optimal number of virtual bot instances). Retraining the machine learning model at step 217 may include retraining the machine learning model with the updated optimal number of virtual bot instances calculated at step 216.

Figure 4:
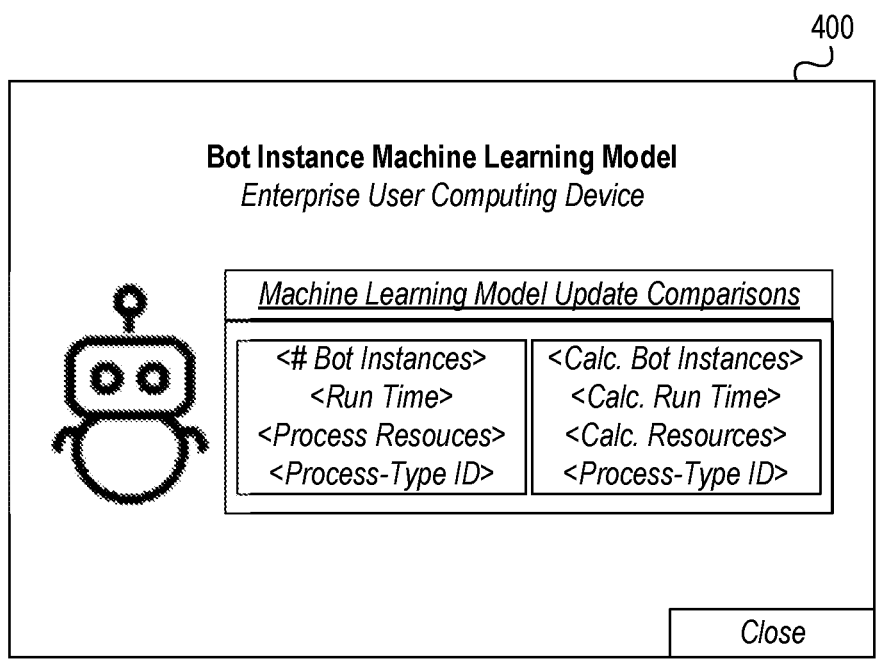

At step 218, the process automation computing platform 110 may send results of the data comparisons and/or machine learning model retraining to the enterprise user computing device 130. At step 219, the enterprise user computing device 130 may display graphics associated with the results. In some embodiments, displaying the graphics associated with the results may include causing an interface for an enterprise associate at the enterprise center to be displayed on at least one monitoring dashboard user interface presented by an associate computing device. For example, in the one or more enterprise computer systems (e.g., enterprise server infrastructure 120 120, enterprise user computing device 130) display graphics associated with the results, process automation computing platform 110 may cause the one or more enterprise computer systems (e.g., enterprise server infrastructure 120 120, enterprise user computing device 130) to display and/or otherwise present one or more graphical user interfaces similar to graphical user interface 400, which is illustrated in FIG. 4. As seen in FIG. 4, graphical user interface 400 may include text and/or other information associated with a "machine learning model update comparisons" results display. The results illustrated in FIG. 4 may, for instance, be sent by process automation computing platform 110 may include a table with a number of data comparisons, e.g., between input or calculated parameters from before the processing and actual or measured parameters from the processing and completion of the work queue. The results display provided by graphical user interface 400 may allow an enterprise associate to visualize key metrics of the machine leaning model and, where applicable, provide one or more inputs as part of retraining the machine learning model and/or adjusting other parameters associated with the process automation computing platform 110 and/or processing workloads by the enterprise system.

Subsequently, the process automation computing platform 110 may repeat one or more steps of the example event sequence discussed above in training and using machine-learning models to determine an optimal number of RPA bot instances to process a work queue. Additionally or alternatively, process automation computing platform 110 may initiate one or more workload analysis processes and/or generate and send one or more data results interfaces, similar to how process automation computing platform 110 may initiate such processes and generate and send such interfaces in the examples described above.

Figure 5:
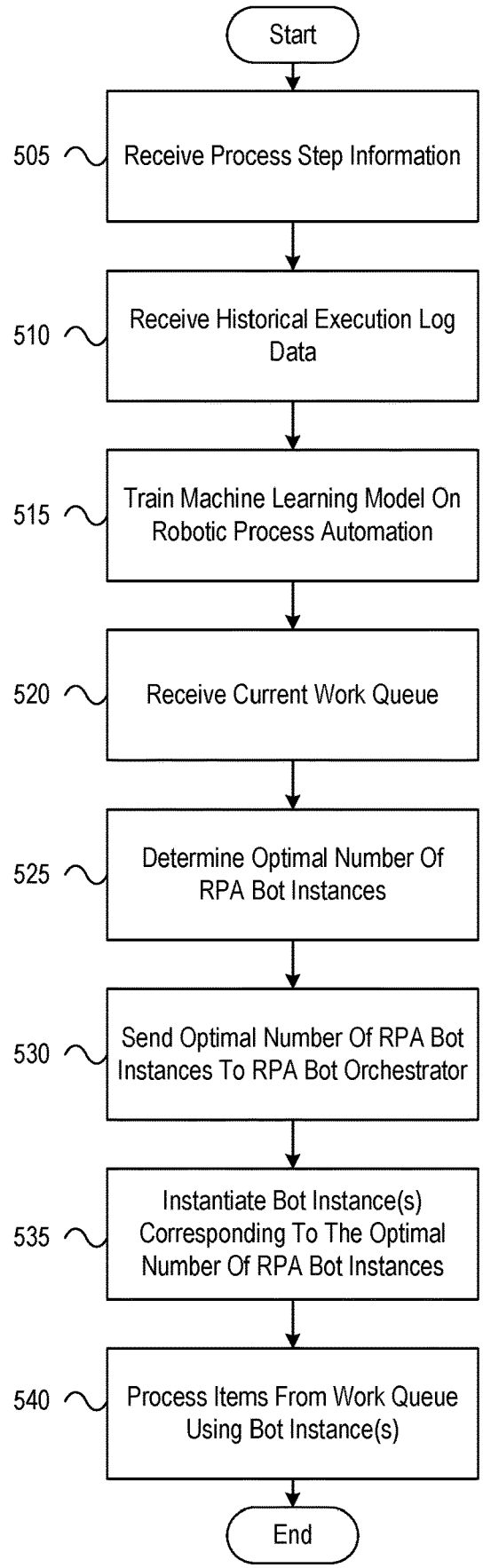
FIG. 5 depicts an illustrative method for training and using machine-learning models to determine an optimal number of RPA bot instances to process a work queue in accordance with one or more example embodiments.

FIG. 5 depicts an illustrative method for training and using machine-learning models to determine an optimal number of RPA bot instances to process a work queue in accordance with one or more example embodiments. Referring to FIG. 5, at step 505, a computing platform having at least one processor, a communication interface, and memory may receive, e.g., via the communication interface and from one or more enterprise data source computer systems, process step information. In a similar manner, at step 510, the computing platform may receive, e.g., via the communication interface and from one or more enterprise data source computer systems, historical execution log data. Receiving the historical execution log data at step 510 may include receiving historical log information automatically loaded and/or sent by a process running on an enterprise server. At step 515 the computing platform may train a machine learning model based on robotic process automation (RPA) using process step information and historical execution log data received at steps 505 and 510.

At step 520, the computing platform may receive a current work queue of items to be processed using one or more RPA bot instances. At step 525 the computing platform may determine, using the machine learning model, an optimal number of RPA bot instances to process a current work queue. At step 530, the computing platform may send the determined optimal number of RPA bot instances to an RPA bot orchestrator on a virtual bot host server. At step 535, the RPA bot orchestrator may then instantiate at least one bot instance corresponding to the determined optimal number of RPA bot instances to process items from the current work queue using the at least one bot instance.

At step 540, the at least one bot instance may process items from the current work queue. In some instances, the computing platform may provide a results display on a display of the computing platform, wherein the results display includes information relating to the current work queue and the determined optimal number of RPA bot instances. In some embodiments, the computing platform may receive an update upon the current work queue being completed. In addition, the computing platform may update a process automation database based on receiving the update of the current work queue being completed, wherein the process automation database is updated to include the one or more metrics associated with completion of the current work queue.

Figure 6:
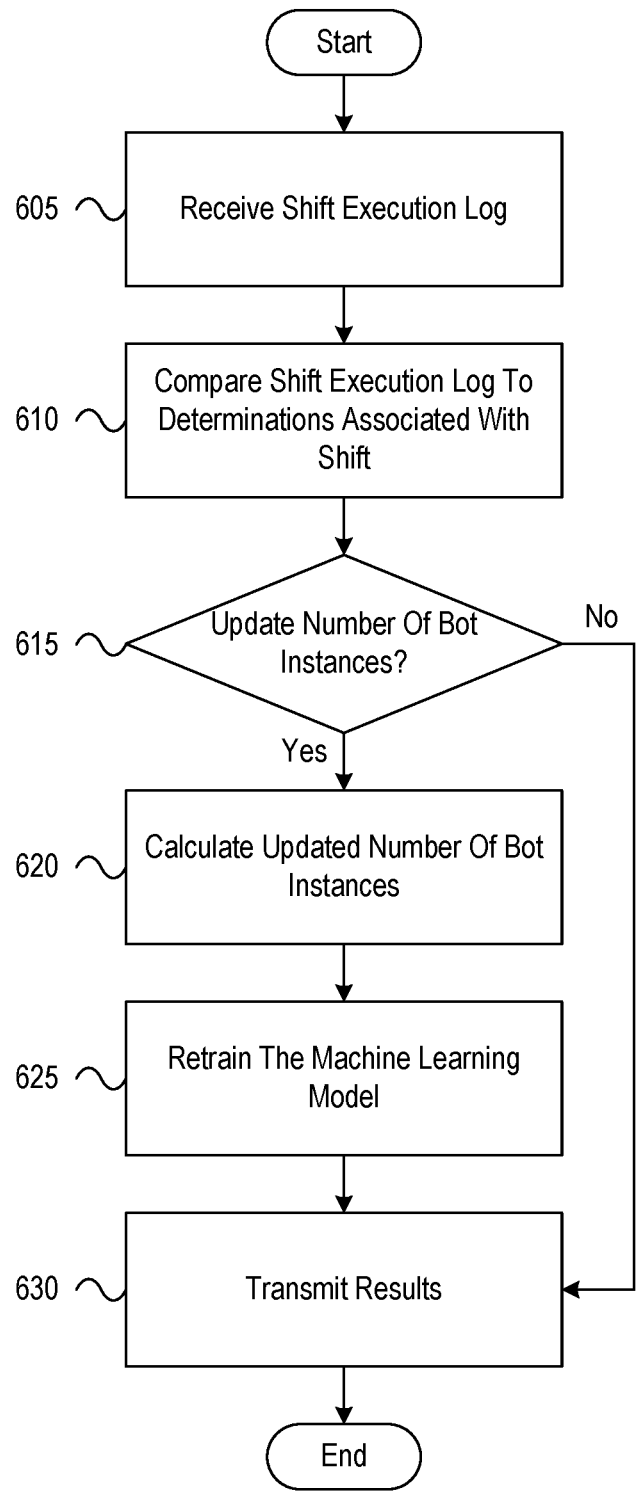
FIG. 6 depicts an illustrative method for retraining machine-learning models used to determine an optimal number of RPA bot instances to process a work queue in accordance with one or more example embodiments.

FIG. 6 depicts an illustrative method for retraining machine-learning models used to determine an optimal number of RPA bot instances to process a work queue in accordance with one or more example embodiments. Referring to FIG. 6, at step 605, a computing platform having at least one processor, a communication interface, and memory may receive, via the communication interface and from one or more enterprise data source computer systems, shift execution log data. The shift execution log may be received at step 605 upon completion of a current work queue. In some arrangements, the shift execution log may include one or more computing metrics associated with completion of a current work queue. At step 610, the computing platform may compare the shift execution log data, e.g., the one or more computing metrics associated with completion of the current work queue, to one or more metrics used in calculating the determined optimal number of RPA bot instances.

At step 615, the computing platform may determine if the machine learning model is to be updated based on comparing the shift execution log data, e.g., the one or more computing metrics associated with completion of the current work queue, to one or more metrics used in calculating the determined optimal number of RPA bot instances. Based upon determining that the machine learning model is to be updated, e.g., to update the number of RPA bot instances calculated by the machine learning model, the computing platform may calculate an updated optimal number of RPA bot instances at step 620. At step 625, the computing platform may retrain the machine learning model with the updated optimal number of RPA bot instances. At step 630, the computing platform may transmit, via the communication interface, results to an enterprise computing device. The results may be associated with completion of the current work queue. Transmitting the results at step 630 may include causing the enterprise computing device to display one or more graphical user interfaces associated with the results on the enterprise computing device.

Devices, systems, and methods, as described herein, relate to workload assessment and configuration for executable applications on an enterprise computing system environment. An entity (e.g., a computing device, a private computing network, an enterprise organization, a multi-platform computing network, etc.) may be associated with an executable application deployed for execution and access by users via a computing system environment, for example, including one or more enterprise computing system environments. The computing system environment may include one or more of a web server, an application server, a database server, an encryption device, a storage device, or a file server.

The system may perform executable applications based on calculations of optimal numbers of RPA bot instances to complete various workloads, for example, increased processing speeds, greater throughput, ability to handle more simultaneous users or user requests, and/or straightforward scalability as the number of users increases or decreases. The scalability benefits may include meeting dynamically changing computing capabilities requirements without requiring dedicated resources to meet the maximum peak performance requirements at all times, although the maximum peak performance may only be infrequently required. Although code for the executable application may have been modified to target the second a computing system environment and/or recompiled with libraries targeted toward a computing system environment, these modifications may not capture or reflect all of the operational and/or environment differences of a computing system environment.

Typically, the various application and/or computing system configuration settings of the computing system environment may simply be configured by a related executable application and/or computing system environment. The configuration settings may include a quantity of workload processes that may be executed simultaneously, a quantity of operations per second that may be performed by the computing system environment, a quantity of memory addresses that may be allocated to one or more processes executed by the computing system environment, or others. An optimal set of application and/or computing system configuration settings for the executable application and/or computing system environment may not yet have been determined due to an absence of predictive information pertaining to the computational requirements, operational behavior, and performance of the executable application.

For example, some executable applications may be unable to effectively process a certain quantity of RPA bot instances at a given time based on a set number of RPA bot instances according to a default set of configuration parameter settings, and may not be optimized to varying setting and/or workload parameters. Performance issues arising in the executable applications on the computing system environment may be due to one or more servers of the computing system environment not being configured optimally. Configuration parameters set for an original executable application on a computing system environment simply being copied over from a previous executable application without a new analysis based on the actual current workload parameters and/or software deployed thereon may lead to the introduction of the performance issues and/or operational problems and errors. This may be due to an assumption that in a cloud computing model featuring the computing system environment, memory and/or computational capacity is unlimited due to scalability and that the migrated executable application will not fail in the cloud computing model due to elasticity of the cloud computing environment. However, performance may be dependent upon configuration settings for the executable application in addition to configuration settings for current workload.

Arrangements discussed herein may address the aforementioned issues by customizing RPA bot instances in accordance with application and/or computing system configuration parameters based on monitoring performance of the RPA bot workload executions in the computing system environment in relation to one or more configuration settings for the workload executions and/or the computing system environment. The aforementioned issues may be addressed by customizing workload and/or computing system parameters based on monitoring performance of the workload executions in the second computing system environment in relation to one or more configuration settings for the workload executions and/or the computing system environment. The customized workload and/or computing system configuration parameters may be based on information from historical workload executions on the computing system environment. The customized workload and/or computing system configuration parameters may comprise determining optimal configuration parameter values and/or ranges of preferred and/or acceptable configuration parameters. Computational optimization, for example, multidimensional optimization, polynomial optimization, artificial intelligence, and/or machine learning techniques may be used to determine best configuration setting values and/or value ranges based on designated target performance metrics, based on the monitored performance of executing a workload in the computing system environment, based on information from historical workload executions on the computing system environment, and/or based on the monitored performance of the workload executions on the computing system environment.

Ongoing adjustments to configuration setting values may be determined based on ongoing monitoring of performance metrics of the workload executions and/or the computing system environment. The monitoring may be in relation to one or more configuration settings for the workload executions and/or the computing system environment. The ongoing adjustments to configuration setting values may also be based on information from historical workload executions on the computing system environment. The ongoing adjustments to configuration setting values may comprise determining optimal configuration parameter values and/or ranges of preferred and/or acceptable workload and/or computing system configuration parameters. The ongoing adjustments to configuration setting values may comprise determining interdependencies of the various configuration parameters and settings. Multidimensional optimization, polynomial optimization, artificial intelligence, and/or machine learning techniques may be used to determine best configuration setting values and/or value ranges based on designated target performance metrics, based on interdependencies of the configuration parameters and settings, and/or based on the monitored performance of the workload executions and/or the computing system environment.

Ongoing monitoring and evaluation of the workload executions and/or the computing system environment may comprise monitoring, logging, and/or analyzing real-time/runtime configuration parameter settings, values, and/or real-time/runtime performance metrics. Logged real-time/runtime data may be validated against defined policies and/or templates. Deviations from acceptable values and ranges may be flagged to notify an administrative function of the deviations, initiate an analysis, and/or initiate a determination of one or more corrective actions that may be taken to bring the performance metrics back into conformance with the policies and/or templates.

Policies and templates may comprise: standard definitions of configuration parameters and/or performance metrics; ideal, upper, and/or lower bound values for the configuration parameters and/or performance metrics; and/or one or more standard combinations of settings and values for the configuration parameters and/or performance metrics upon which operation of the executable application may be based.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
train a machine learning model based on robotic process automation (RPA) using process step information and historical execution log data;
receive a current work queue of items to be processed using one or more RPA bot instances;
determine, using the machine learning model, an optimal number of RPA bot instances to process the current work queue;
send the determined optimal number of RPA bot instances to a RPA bot orchestrator on a virtual bot host server, wherein sending the determined optimal number of RPA bot instances to the RPA bot orchestrator causes the orchestrator to instantiate at least one bot instance corresponding to the determined optimal number of RPA bot instances to process items from the current work queue using the at least one bot instance;
upon completing the current work queue, analyze one or more computing metrics associated with completion of the current work queue to calculate an updated optimal number of RPA bot instances; and
retrain the machine learning model with the updated optimal number of RPA bot instances.

2. The computing platform of claim 1, wherein analyze one or more computing metrics associated with completion of the current work queue includes:
receiving a shift execution log upon completion of the current work queue, wherein the shift execution log includes the one or more computing metrics associated with completion of the current work queue.

3. The computing platform of claim 2, wherein analyzing one or more computing metrics associated with completion of the current work queue includes:
   comparing the one or more computing metrics associated with completion of the current work queue to one or more metrics used in calculating the determined optimal number of RPA bot instances; and
   determining if the machine learning model is to be updated based on comparing the one or more computing metrics associated with completion of the current work queue to one or more metrics used in calculating the determined optimal number of RPA bot instances.

4. The computing platform of claim 3, wherein calculating the updated optimal number of RPA bot instances occurs upon determining that the machine learning model is to be updated.

5. The computing platform of claim 1, wherein the memory further stores computer-readable instructions that, when executed by the at least one processor, cause the computing platform to:
   send results associated with completion of the current work queue to an enterprise computing device, wherein sending the results causes the enterprise computing device to display one or more graphical user interfaces associated with the results on the enterprise computing device.

6. The computing platform of claim 1, wherein training the machine learning model includes receiving process step information automatically loaded by a process running on an enterprise server.

7. The computing platform of claim 1, wherein training the machine learning model includes receiving historical log information automatically sent by a process running on an enterprise server.

8. The computing platform of claim 1, wherein the memory further stores computer-readable instructions that, when executed by the at least one processor, cause the computing platform to:
   provide a results display on a display of the computing platform, wherein the results display includes information relating to the current work queue and the determined optimal number of RPA bot instances.

9. The computing platform of claim 1, wherein the memory further stores computer-readable instructions that, when executed by the at least one processor, cause the computing platform to:
   receive an update upon the current work queue being completed.

10. The computing platform of claim 9, wherein the memory further stores computer-readable instructions that, when executed by the at least one processor, cause the computing platform to:
    update a process automation database based on receiving the update of the current work queue being completed, wherein the process automation database is updated to include one or more metrics associated with completion of the current work queue.

11. A method, comprising:
    at a computing platform comprising at least one processor, a communication interface, and memory:
        training, by the at least one processor, a machine learning model based on robotic process automation (RPA) using process step information and historical execution log data;
        receiving, by the at least one processor, via the communication interface, a current work queue of items to be processed using one or more RPA bot instances;
        determining, using the machine learning model, an optimal number of RPA bot instances to process the current work queue;
        sending, by the at least one processor, via the communication interface, the determined optimal number of RPA bot instances to a RPA bot orchestrator on a virtual bot host server, wherein sending the determined optimal number of RPA bot instances to the RPA bot orchestrator causes the orchestrator to instantiate at least one bot instance corresponding to the determined optimal number of RPA bot instances to process items from the current work queue using the at least one bot instance;
        upon completing the current work queue, analyzing one or more computing metrics associated with completion of the current work queue to calculate an updated optimal number of RPA bot instances; and
        retraining the machine learning model with the updated optimal number of RPA bot instances.

12. The method of claim 11, wherein analyzing one or more computing metrics associated with completion of the current work queue includes receiving, by the at least one processor, a shift execution log upon completion of the current work queue, wherein the shift execution log includes the one or more computing metrics associated with completion of the current work queue.

13. The method of claim 12, wherein analyzing one or more computing metrics associated with completion of the current work queue includes:
    comparing, by the at least one processor, the one or more computing metrics associated with completion of the current work queue to one or more metrics used in calculating the determined optimal number of RPA bot instances; and
    determining, by the at least one processor, if the machine learning model is to be updated based on comparing the one or more computing metrics associated with completion of the current work queue to one or more metrics used in calculating the determined optimal number of RPA bot instances.

14. The method of claim 13, wherein
    calculating the updated optimal number of RPA bot instances occurs upon determining that the machine learning model is to be updated.

15. The method of claim 11, further comprising:
    sending, by the at least one processor, via the communication interface, results associated with completion of the current work queue to an enterprise computing device, wherein sending the results causes the enterprise computing device to display one or more graphical user interfaces associated with the results on the enterprise computing device.

16. The method of claim 11, wherein training the machine learning model includes receiving process step information automatically loaded by a process running on an enterprise server.

17. The method of claim 11, wherein training the machine learning model includes receiving historical log information automatically sent by a process running on an enterprise server.

18. The method of claim 11, further comprising:
    providing a results display on a display of the computing platform, wherein the results display includes information relating to the current work queue and the determined optimal number of RPA bot instances.

19. The method of claim 11, further comprising:
receiving, by the at least one processor, via the communication interface, an update upon the current work queue being completed, and
updating, by the at least one processor, a process automation database based on receiving the update of the current work queue being completed, wherein the process automation database is updated to include one or more metrics associated with completion of the current work queue.

20. One or more non-transitory computer-readable media storing instructions that, when executed by a computing platform comprising at least one processor, a communication interface, and memory, cause the computing platform to:
train a machine learning model based on robotic process automation (RPA) using process step information and historical execution log data;
receive a current work queue of items to be processed using one or more RPA bot instances;
determine, using the machine learning model, an optimal number of RPA bot instances to process the current work queue;
send, via the communication interface, the determined optimal number of RPA bot instances to a RPA bot orchestrator on a virtual bot host server, wherein sending the determined optimal number of RPA bot instances to the RPA bot orchestrator causes the orchestrator to instantiate at least one bot instance corresponding to the determined optimal number of RPA bot instances to process items from the current work queue using the at least one bot instance;
upon completing the current work queue, analyze one or more computing metrics associated with completion of the current work queue to calculate an updated optimal number of RPA bot instances; and
retrain the machine learning model with the updated optimal number of RPA bot instances.

* * * * *